UNITED STATES PATENT OFFICE.

TRUMAN J. PEARCE AND MELVIN W. BEARDSLEY, OF OAKLAND, ASSIGNORS TO THE PARAFFINE PAINT COMPANY, OF SAN FRANCISCO, CALIFORNIA.

MANUFACTURE OF PAPER.

SPECIFICATION forming part of Letters Patent No. 378,520, dated February 28, 1888.

Application filed March 9, 1887. Serial No. 230,307. (No specimens.)

*To all whom it may concern:*

Be it known that we, TRUMAN J. PEARCE and MELVIN W. BEARDSLEY, citizens of the United States, residing in the city of Oakland, county of Alameda, and State of California, have invented certain new and useful Improvements in the Production and Manufacture of Paper having Water-Proof, Non-Conducting, and other Valuable Properties and Qualities; and we do hereby declare that the following is a full, clear, and exact description of our said invention and of the manner in which we produce, apply, and carry out the same.

Our invention relates to the production and manufacture of a paper for general use, as well as for many special purposes, where a wrapping, covering, or lining is required that will afford complete protection from air and moisture, that will be unaffected by exposure to heat or cold and the action of acids and alkalies, and that will be free from odor. We have discovered that paper coated, impregnated, or saturated with maltha will acquire several valuable properties and qualities which will not deteriorate under exposure and use, but will endure for an indefinite length of time. It will withstand extremes of heat and cold and will be found highly useful for a non-conducting lining or covering. It is water-proof and weather-proof and will resist acids and alkalies to a remarkable degree. Its natural flexibility not being materially affected by the process of manufacture or treatment, it will be suitable for wrapping or packing goods and merchandise where protection from air and moisture, salt-water, and other injurious agencies is desired. It will be found useful, also, for many purposes and in many situations where tarred paper and similar material cannot be employed to advantage, because of the unpleasant and objectionable odor, as, when properly prepared, our improved paper is free from odor.

Our invention consists, therefore, in the production of a non-absorbent, non-conducting, water-proof, and odorless paper, of various grades or qualities of thickness, body, and surface, with maltha, as hereinafter explained.

The product and substance known as "maltha," which we employ and utilize in the manufacture of our improved paper, is the solid residuum obtained in the distillation of the heavier grades of petroleum, and, as procured from oil-refineries in many localities, it is sufficiently free from earthy and other foreign solid matter to be used without any preparatory treatment; but where it is found and procured in a more or less unclean condition it is necessary to eliminate the sand and other impurities mixed with it before it is suitable for this purpose. When this condition is obtained, the maltha is melted and reduced to a consistency sufficiently fluid to enable it to be applied to the paper, and, this condition being maintained during the operation, the paper is coated and for some purposes is saturated with the material by using suitable machinery for applying it in a uniform manner.

An apparatus which we have used to good advantage consists of a vat or shallow receptacle with a furnace or steam-heater beneath it and a set of rollers.

In preparing our paper, it first passes through the maltha in the vat and then passes on to the rollers, which spread the material over the paper and make it of any uniform thickness required. The rollers should have suitable adjustability as to the space between them and the degree of pressure with which they act on the paper to properly distribute the maltha on the two sides of the paper. By this means the paper can be treated at a single operation in going once through the apparatus; but of course it is evident that additional coats or an increased degree of saturation can be obtained by running the paper through again; and for thinner paper—such as Manila paper—we use scrapers. In this manner we run the paper through the vat and then under, through, and over the scrapers, with exposed edges reversed, which are kept hot by steam or other means. This forms a faster and better mode of applying the coating.

The maltha is kept as nearly as possible at uniform temperature to maintain the desired consistency and in a condition sufficiently fluid to work smoothly and take into the paper being treated. A temperature from 150° to 250° Fahrenheit will keep the maltha at suitable consistency for general use.

All grades and qualities of paper—from thin to the thickest and heaviest kinds—can be treated with the maltha to produce any desired weight, strength, or thickness of our improved article, and by having suitable arrangement of rollers for carrying the paper after being coated until it is sufficiently dry to be rolled again we can treat paper in the roll as well as in sheets.

An excellent article for use as a non-conducting lining for refrigerators and cold-air rooms and for like purposes is produced by covering or saturating heavy paper or strawboard with maltha.

From the foregoing description any person skilled in the art of coating or treating paper with matter or substances that require to be applied warm or in a melted condition will understand how to produce our improved article in any desired grade or character of weight, thickness, and stiffness.

In a patent granted to us on the 14th of September, 1886, No. 348,995, we have claimed a paper treated with a compound of bisulphide of carbon and maltha, and in the present application bisulphide of carbon is omitted, as the maltha makes a good coating in itself.

Having thus fully described our invention, what we claim as new, and desire to secure by Letters Patent, is—

As a new article of manufacture and of commerce, paper coated or saturated with maltha, substantially as herein set forth.

In witness whereof we have hereunto signed our names in the presence of two subscribing witnesses.

TRUMAN J. PEARCE.
MELVIN W. BEARDSLEY.

Witnesses:
GEO. W. SWAN, Jr.,
JNO. P. WALLACE.